United States Patent [19]

Dewald, Jr. et al.

[11] Patent Number: 5,295,430

[45] Date of Patent: Mar. 22, 1994

[54] EQUALIZER FOR SLIDING TUBULAR MEMBERS

[76] Inventors: James E. Dewald, Jr., Mishawaka; Patrick W. McManus, both of 1023 W. 8, P.O. Box 703, Mishawaka, Ind. 46544

[21] Appl. No.: 912,733

[22] Filed: Jul. 13, 1992

[51] Int. Cl.⁵ ............................................. F16J 15/18
[52] U.S. Cl. .................................... 92/165 R; 296/26
[58] Field of Search ..................... 92/165 R, 165 PR; 296/170, 171, 172, 175, 176, 26

[56] References Cited

U.S. PATENT DOCUMENTS

| | | | |
|---|---|---|---|
| 2,987,342 | 6/1961 | Meaker et al. | 296/171 |
| 4,480,866 | 11/1984 | Komatsu | 296/26 X |
| 5,113,746 | 5/1992 | Yuda | 92/165 PR |

Primary Examiner—Edward K. Look
Assistant Examiner—F. Daniel Lopez
Attorney, Agent, or Firm—James D. Hall; Thomas J. Dodd; R. Tracy Crump

[57] ABSTRACT

An equalizer for passively controlling the movements of two or more sliding tubes. The equalizer includes a plurality of pulleys interconnected by cables. The cables are movably connected between the pulleys and the movable tubes to ensure the equalization of movement of one tube relative to the other.

5 Claims, 7 Drawing Sheets

EQUALIZER FOR SLIDING TUBULAR MEMBERS

SUMMARY OF THE INVENTION

This invention relates to mechanical equalizers, and will have application to an equalizer for passively controlling the movement of two or more tubular members.

Hydraulic power has many advantages over electrical drive systems, particularly with regard to the movement of large supports. Hydraulic systems are more efficient with regard to both energy and generated power, as well as being more easily maintained.

The lone drawback to hydraulic power systems in the operation of two or more sliding tubular members is the need for multiple hydraulic cylinders to synchronize the movement of the tubes. This is particularly true in the RV slide-out rooms, where electric power and gear equalizers has been the favored power train.

The equalizer of this invention is designed to passively control the correlative movements of two or more sliding tubes. The use of this equalizer will allow for fewer hydraulic cylinders to be used in moving the tubes, and allowing the RV industry, among others to realize the benefits and advantages of hydraulic power.

The equalizer includes a system of pulleys and a movable cable. The pulleys are positioned at various locations adjacent to each tube and the cable is fitted in an outer groove thereof. The cable is connected to each movable tube. When correlative movement between two tubes differs, the cable pulls at the tube which is less extended to speed its movement and allow the tube(s) to catch up. When positioning is equal between tubes, no pressure is exerted and the tubes travel freely.

Accordingly, it is an object of this invention to provide an equalizer for multiple sliding tubes.

Another object is to provide an equalizer which passively controls sliding correlative movement and positioning of two or more tubes.

Another object is to provide an equalizer which is efficient, durable and is easy to maintain and service.

Other objects will become apparent upon a reading of the following description.

DESCRIPTION OF THE PREFERRED EMBODIMENTS

The preferred embodiments herein described are not intended to be exhaustive or to limit the invention to the precise forms disclosed. They are chosen and described to explain the principles of the invention and their application and practical use to enable others skilled in the art to utilize its teachings.

Figure 1:
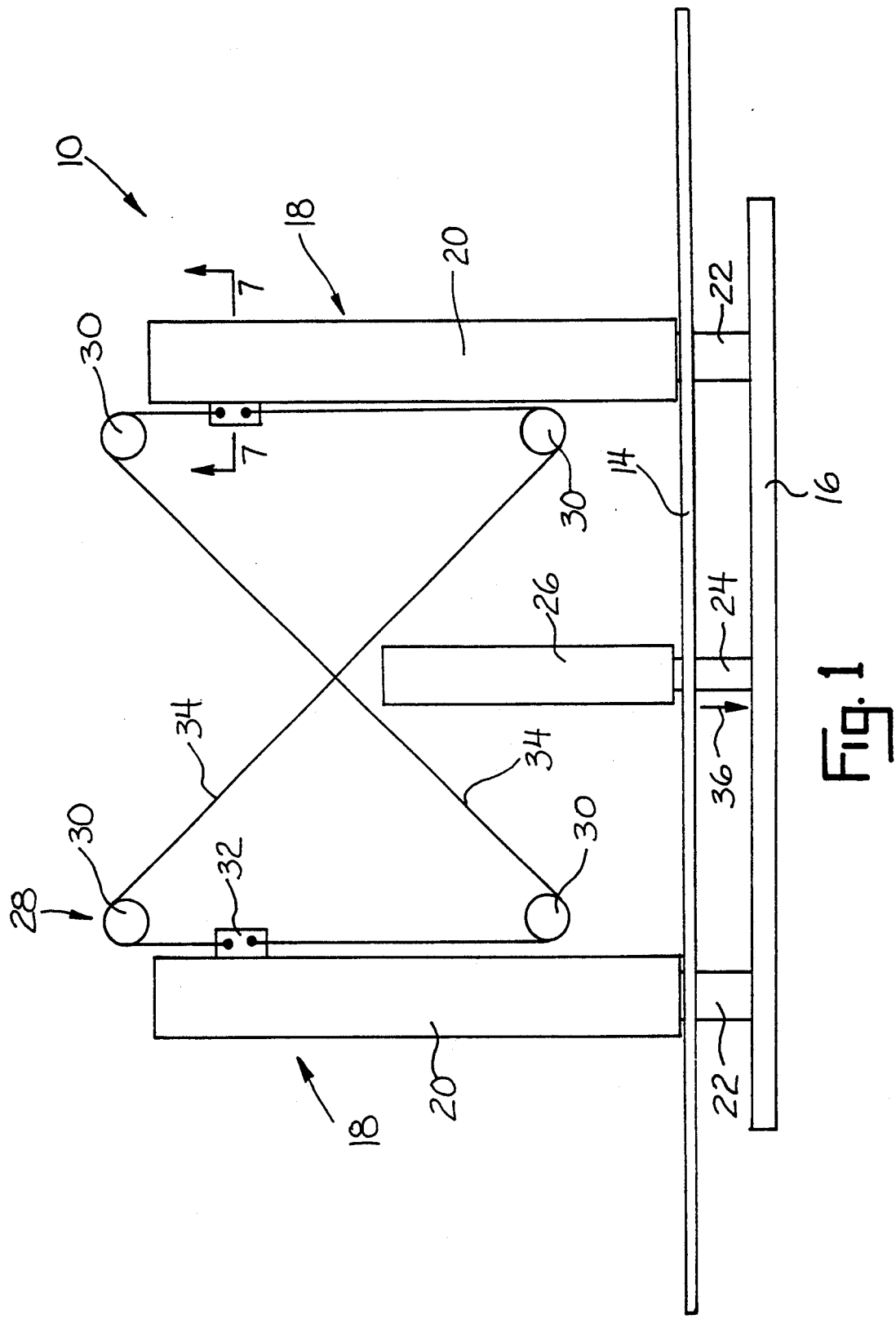
FIG. 1 is a plan view of the equalizer system of this invention showing a first preferred pulley arrangement.

Referring first to FIG. 1, reference numeral 10 generally designates a sliding support system commonly used to support a slide-out room in a recreational vehicle (not shown). Support system 10 includes an outer support rail 14 and a room frame rail 16. Tubular supports 18 (two shown) include guide tube 20 and telescoping extensible tube 22 which is slidably fitted in guide tube 20 and attached to rail 16. Extension of tube 22 is accomplished by the extension of piston rod 24 of hydraulic cylinder 26. Rod 24 is connected to rail 16 as shown.

The above description illustrates a conventional slide-out room support system 10. FIG. 1 also illustrates the equalizer system 28 of this invention. Equalizer 28 includes two or more pulleys 30 (four are shown) which are rotatably connected to the frame (not shown) of the vehicle. Each slidable tube 22 includes a connecting bracket 32 fixedly fastened thereto which slides along with the tube 22 during extension and retraction. A cable 34 is fixedly connected to each bracket 32 and extends across each pulley 30.

Figure 7:
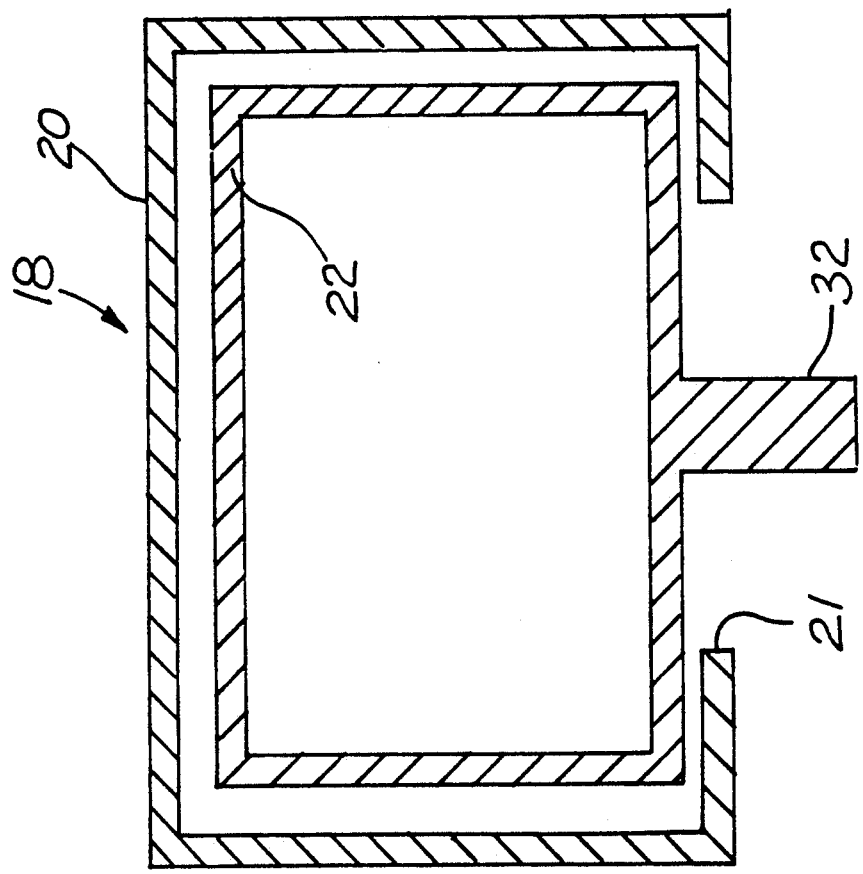
FIG. 7 is a sectional view taken along line 7—7 of FIG. 1.

As shown in FIG. 7, each guide tube 20 has a longitudinal slot 21 to accommodate sliding movement of bracket 32 relative to the guide tube. Bracket 32 extends outwardly of tube 22 and through slot 21 as shown.

Operation of the slide-out room is conventional. When desired, a user actuates hydraulic cylinder 26 through a switch or other conventional means. Rod 24 extends outwardly in the direction of arrow 36 to urge frame rail 16 outwardly of rail 14. The connection of rail 16 to slide tubes 22 causes extension of the slide tubes relative to guide tubes 20 and rail 14.

A the tubes 22 extend relative to tubes 20, the fixed connections of bracket 32 and cable 34 cause the cable to be drawn across pulleys 30. If one of the slide tubes 22 begins to extend further than the other slide tube, the tension on cable 34 and bracket 32 increases to slow its movement and the other slide tube to "catch up." As such, sliding movement of tubes 22 is equalized to ensure that rail 16 remains substantially parallel to rail 14 during extension.

This arrangement of equalizer 28 allows the use of a single hydraulic cylinder in the system shown. Previously, hydraulically driven systems of this type required the use of a separate cylinder for each tube. These prior systems also required precise calibration of the cylinders to ensure equal movements of the slide tubes during extension and retraction.

Figure 2:
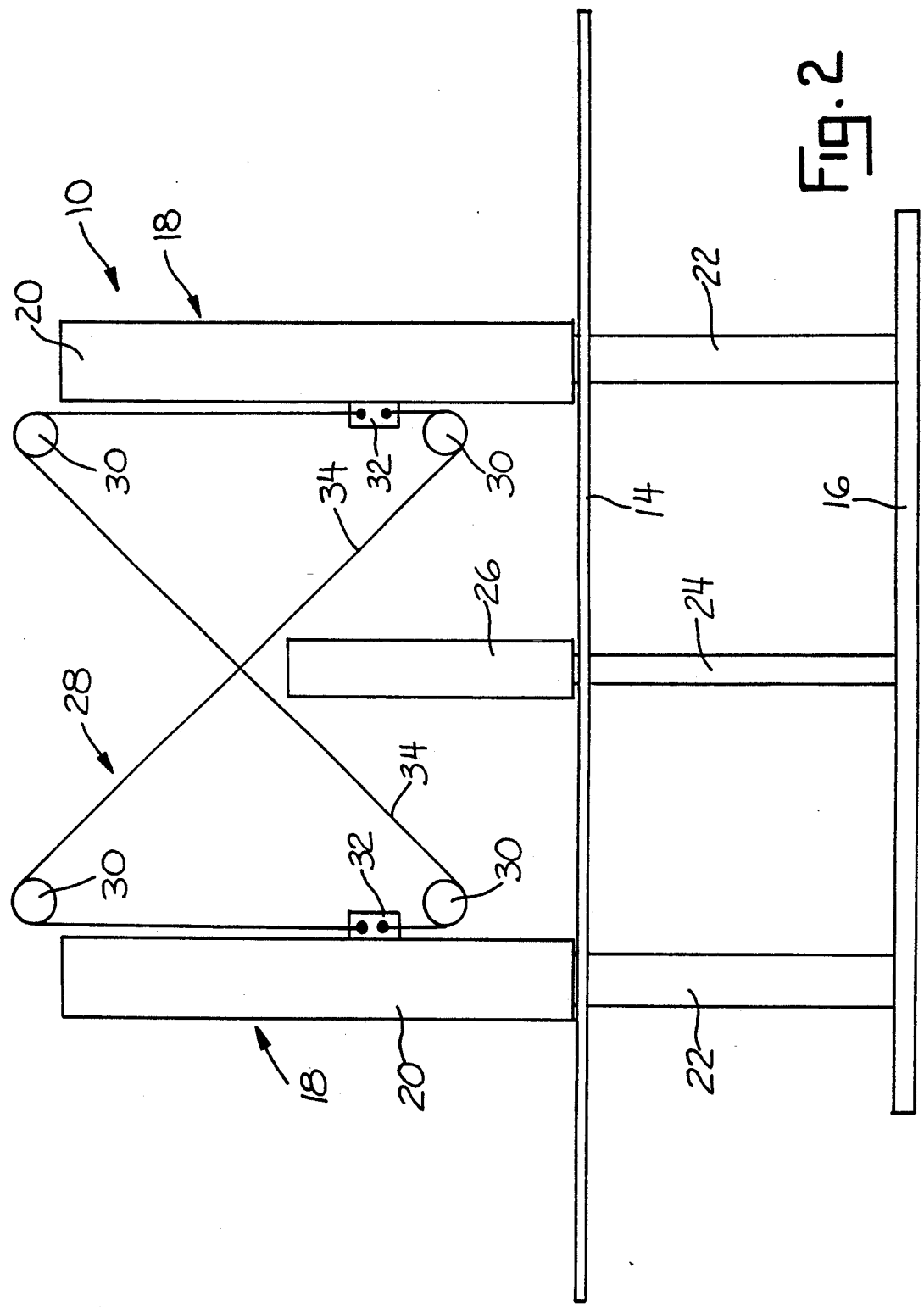
FIG. 2 is a plan view of the system of FIG. 1 in an extended position.
Figure 3:
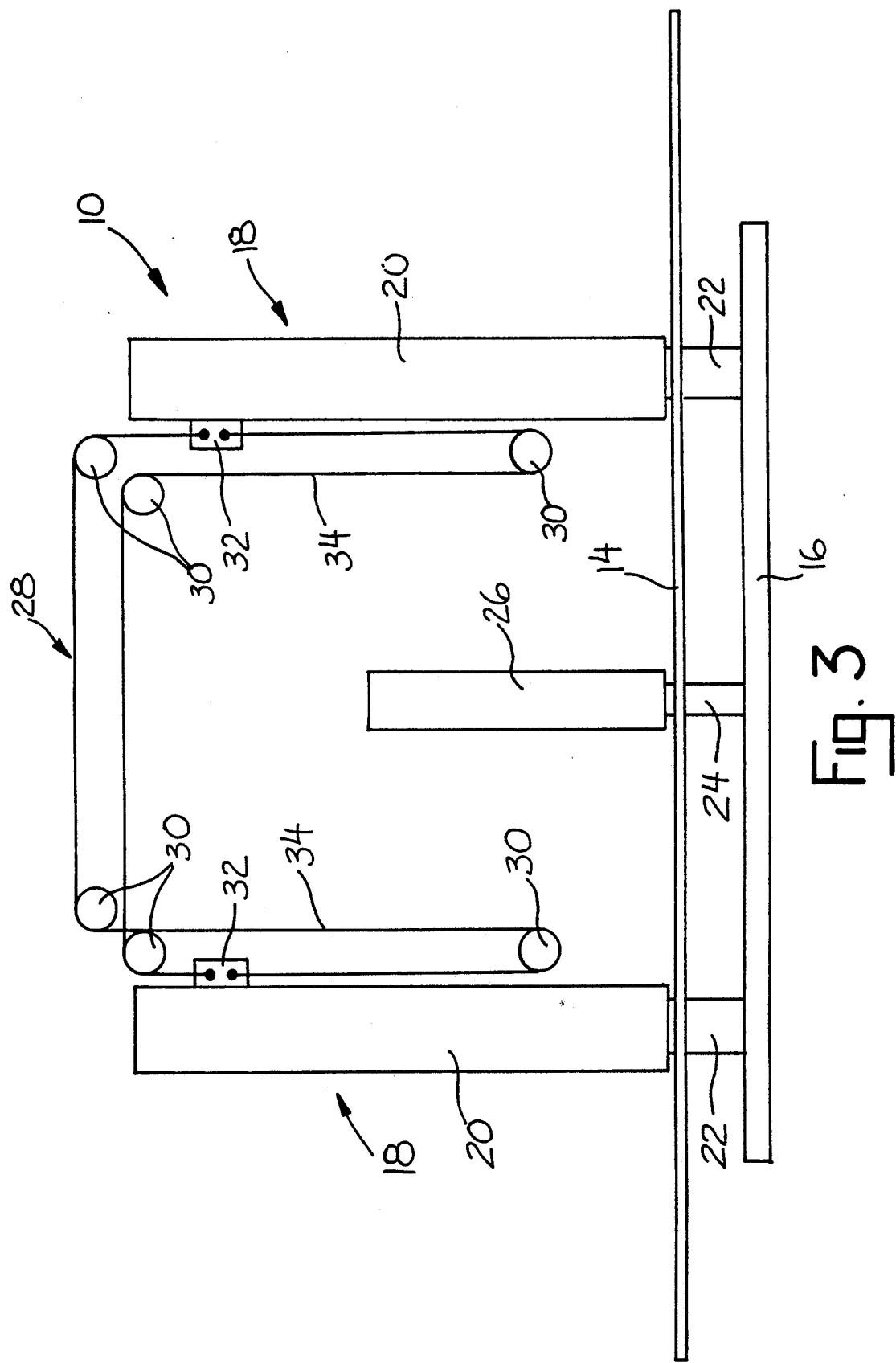
FIG. 3 is a plan view of the equalizer showing a second pulley arrangement.
Figure 4:
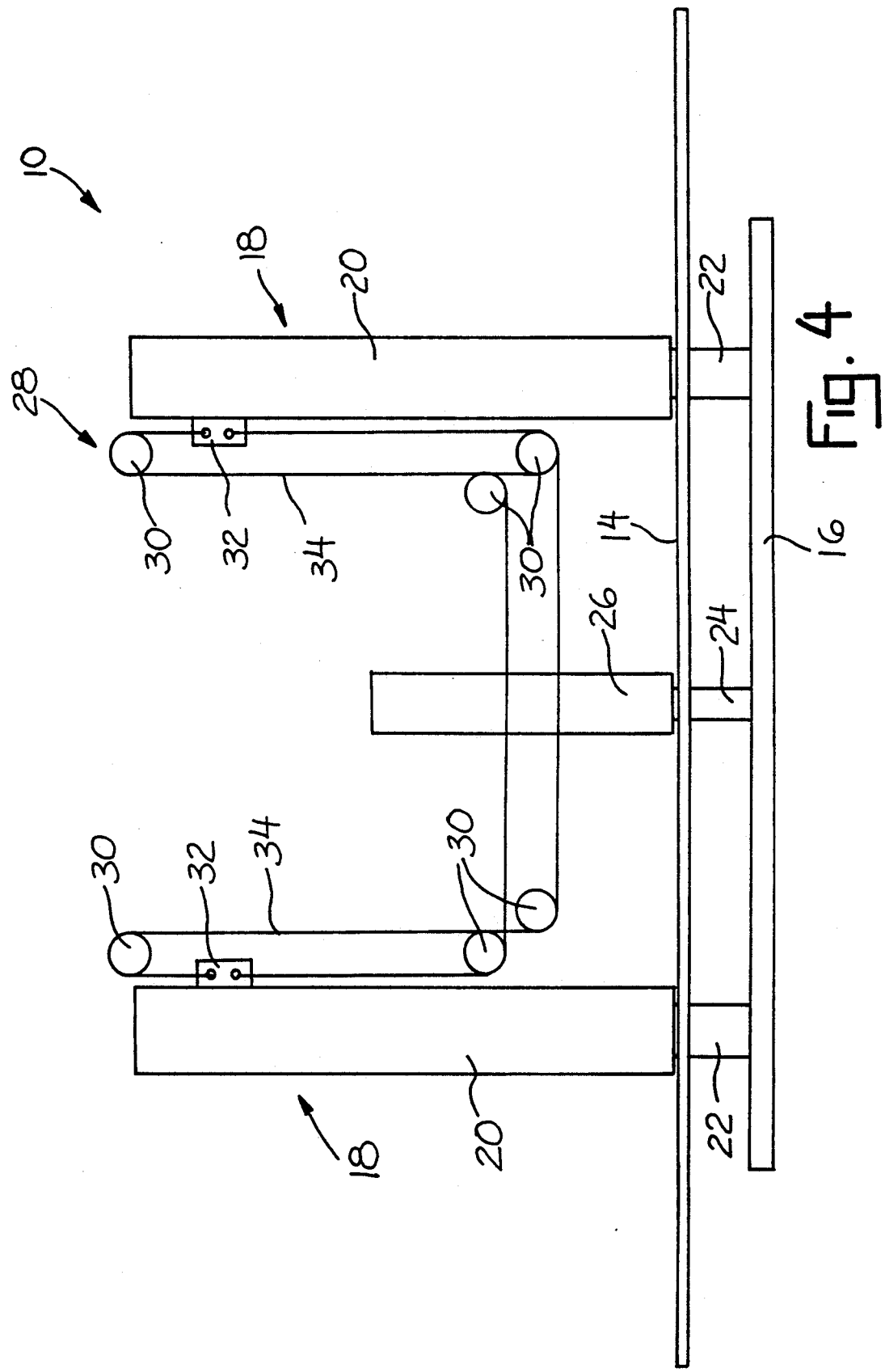
FIG. 4 is a plan view of the equalizer showing a third pulley arrangement.

FIGS. 1 and 2 illustrate and "X" configuration of pulleys 30 and cable 34. FIGS. 3 and 4 illustrate alternative configurations of the pulleys 30 and cables 34 and are illustrative of the multiplicity of configurations which system 28 may take in practice.

Figure 5:
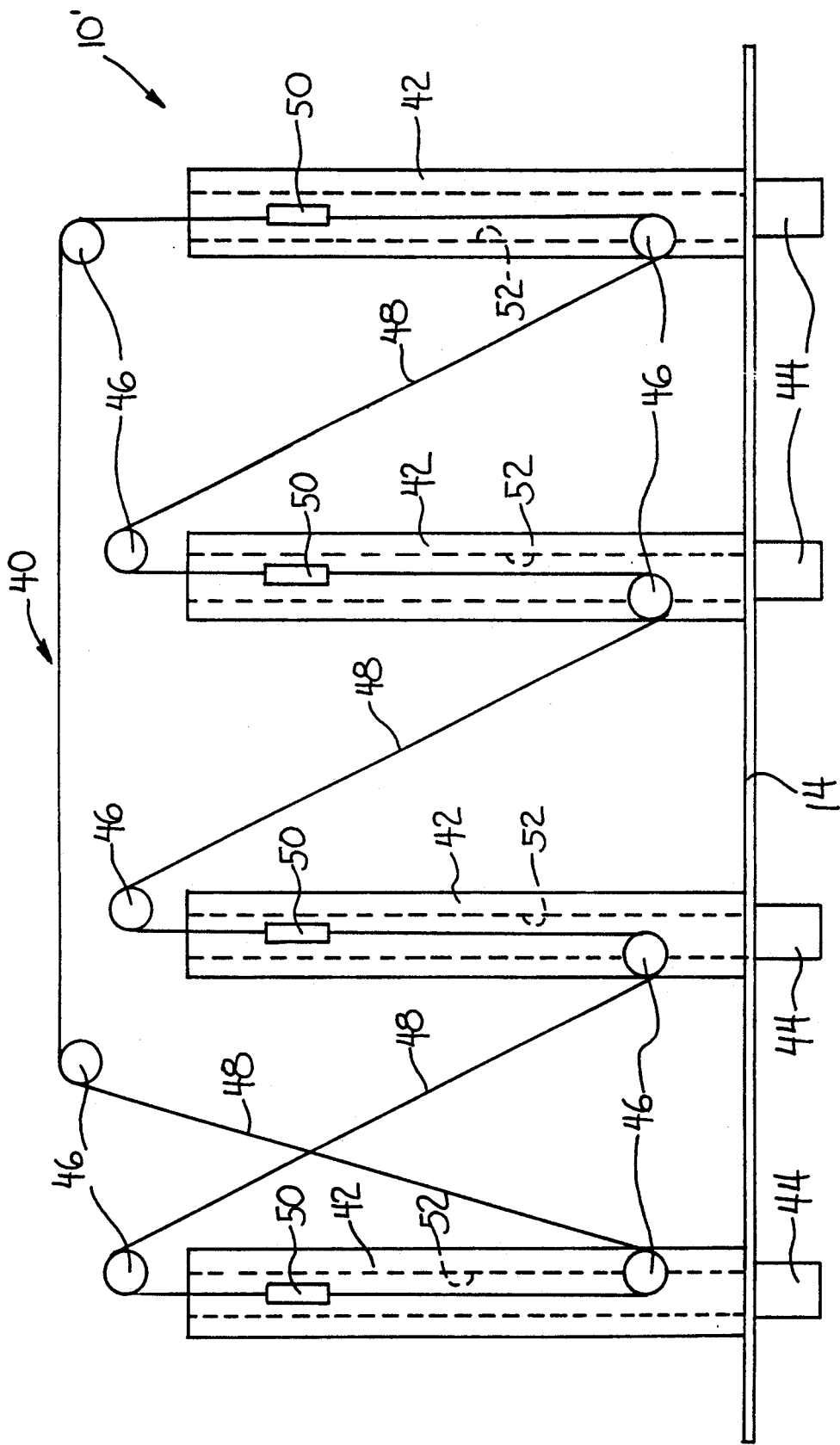
FIG. 5 is a plan view of the equalizer used in a four tube system.
Figure 6:
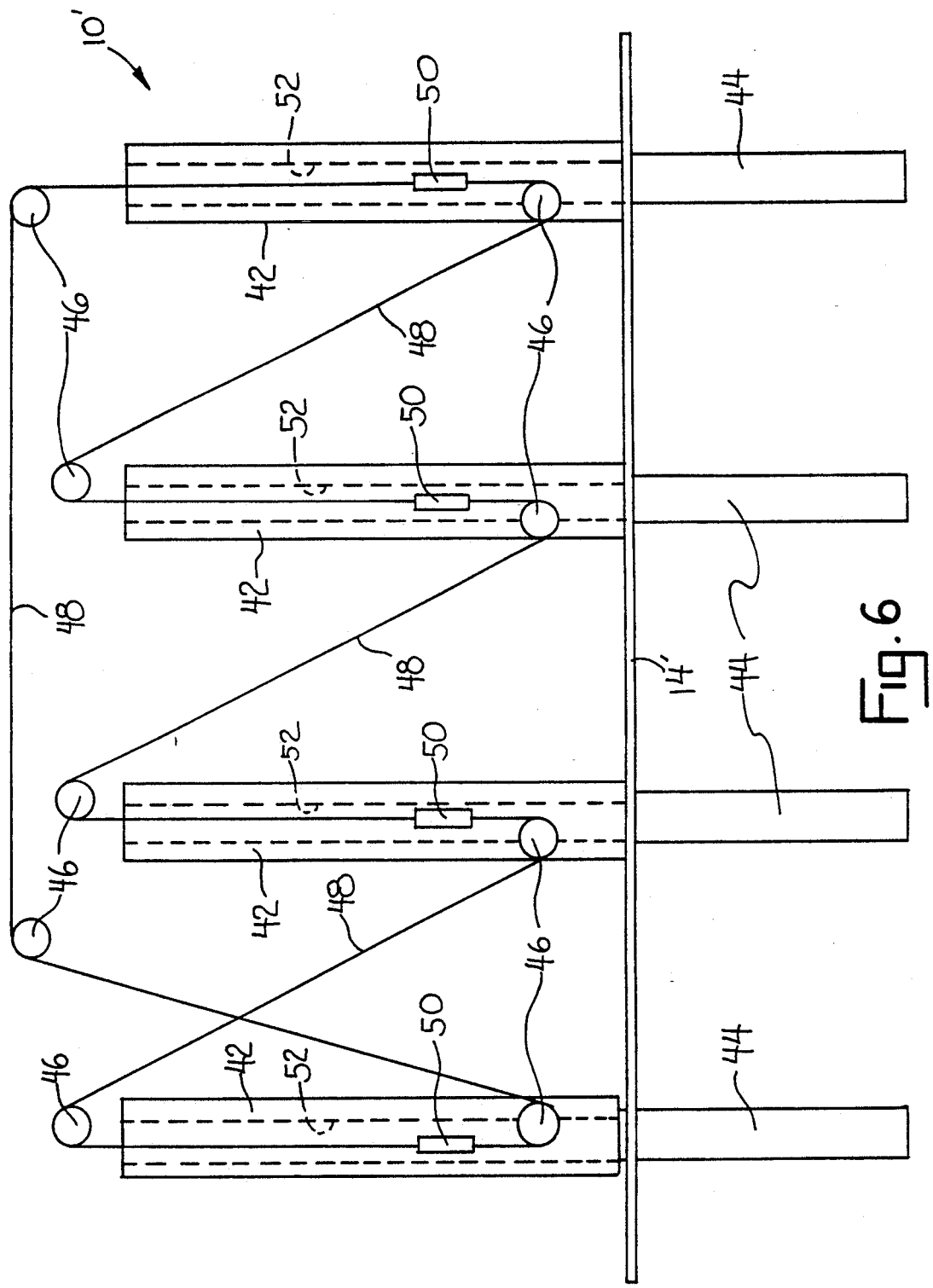
FIG. 6 is a plan view of the system of FIG. 5 in an extended position.

FIGS. 5 and 6 illustrate the use of equalizer system 40 with a support system 10' having a large number of guide tubes 42 and slide tubes 44. Equalizer system 40 includes pulleys 46 and cable 48 positioned as shown in the drawings. Cables 48 are connected to brackets 50 which are connected to each slide tube 44 and ride in elongated slots 52 along with the moving slide tubes. The principle of operation is the same as that described for equalizer system 28.

Use of any of the equalizers 28, 40 shown enables the calibration of multiple slide tubes for synchronized movement without providing a separate power driven cylinder for each individual tube. Although multiple arrangement are shown, the invention is not limited to the forms, nor is the use limited to slide out rooms.

We claim:

1. In a power driven system including a stationary frame and a movable frame, a sliding member of said movable frame connected to each of a plurality of slide tubes, each slide tube slidably fitted in a stationary guide tube, and power assist means for effecting sliding movement of said slide tubes relative to said guide tubes between a full extended position and a full retracted position, the improvement comprising an equalizer means connecting said equalizer between said slide tubes and said stationary frame, said equalizer constituting means for synchronizing movement of said slide tubes as the slide tubes are shifted between said extended and retracted positions.

2. The power driven system of claim 1 wherein said power assist means is a hydraulic cylinder having a push rod connected to said movable frame.

3. The power driven system of claim 1 wherein said equalizer includes a plurality of pulleys connected to said stationary frame, and a cable extending across said pulleys, said cable connected to two of said slide tubes whereby correlative movement of said slide tubes and said cable is effected.

4. In a power driven system including a stationary frame and a movable frame, first and second slide tubes connected to said frame, each slide tube slidably fitted in a stationary guide tube, and power assist means for effecting sliding movement of said slide tubes relative to said guide tubes between a full extended position and a full retracted position, an equalizer, means connecting said equalizer between said slide tubes and said stationary frame, said equalizer constituting means for synchronizing movement of said slide tubes as the slide tubes are shifted between said extended and retracted positions, said equalizer including a plurality of pulleys connected to said stationary frame, and a cable extended across said pulleys, said cable connected to each of said slide tubes whereby correlative movement of said slide tubes and said cable is effected, each guide tube defining an elongated channel, a mounting bracket connected to each slide tube and extending through said channel, said cable connected to each mounting bracket, said cable having a first end fixedly connected to one said mounting bracket and a second end fixedly connected to the other said mounting bracket, a portion of said first cable between said first and second ends thereof extending across and contacting at least two of said pulleys.

5. The power driven system of claim 4 and a second cable having a first end fixedly connected to said first-mentioned mounting bracket, and a second end fixedly connected to said second mounting bracket, a portion of said second cable between its said first and second ends extending across and contacting at least two of said pulleys.

* * * * *

(12) REEXAMINATION CERTIFICATE (4705th)
United States Patent
Dewald, Jr. et al.

(10) Number: US 5,295,430 C1
(45) Certificate Issued: Jan. 7, 2003

(54) EQUALIZER FOR SLIDING TUBULAR MEMBERS

(75) Inventors: James E. Dewald, Jr., Mishawaka, IN (US); Patrick W. McManus, Mishawaka, IN (US)

(73) Assignee: VT Holdings II, Inc., Reno, NV (US)

Reexamination Request:
No. 90/005,973, Apr. 5, 2001

Reexamination Certificate for:
Patent No.: 5,295,430
Issued: Mar. 22, 1994
Appl. No.: 07/912,733
Filed: Jul. 13, 1992

(51) Int. Cl.⁷ .............................. F16J 15/18
(52) U.S. Cl. ..................... 92/165 R; 296/26.13
(58) Field of Search .............. 92/165 R, 165 PR; 296/26.13, 170, 171, 172, 175, 176

(56) References Cited

U.S. PATENT DOCUMENTS

| | | |
|---|---|---|
| 1,238,297 A | 8/1917 | Johanson |
| 1,279,819 A | 9/1918 | Zingsheim et al. |
| 1,521,635 A | 1/1925 | Lewis |
| 1,943,280 A | 1/1934 | Arnold |
| 2,136,130 A | 11/1938 | Gorlenko |
| 2,168,069 A | 8/1939 | Miller |
| 2,193,352 A | 3/1940 | Thomas |
| 2,368,748 A | 2/1945 | Doty |
| 2,484,312 A | 10/1949 | Rebours |
| 2,538,736 A | 1/1951 | Spencer |
| 2,561,921 A | 7/1951 | Guillot |
| 2,704,223 A | 3/1955 | Houdart |
| 2,739,833 A | 3/1956 | Schenkel et al. |
| 2,749,174 A | 6/1956 | Medford |
| 2,756,094 A | 7/1956 | Marple |
| 2,813,747 A | 11/1957 | Rice, Jr. |
| 2,820,666 A | 1/1958 | Grochmal |
| 2,831,722 A | 4/1958 | Hanson et al. |
| 2,842,972 A | 7/1958 | Houdart |
| 2,913,775 A | 11/1959 | Sailor |
| 2,944,852 A | 7/1960 | Snyder |
| 3,000,664 A | 9/1961 | Martin |
| 3,046,047 A | 7/1962 | Ferrera |
| 3,070,850 A | 1/1963 | McClure, Sr. |
| 3,106,750 A | 10/1963 | Jarman |
| 3,137,041 A | 6/1964 | Mullen |
| 3,181,910 A | 5/1965 | Thomas |
| 3,271,065 A | 9/1966 | Scuris |
| 3,408,102 A | 10/1968 | McNamee |
| 3,462,772 A | 8/1969 | Morrison |
| 3,485,479 A | 12/1969 | Baker |
| 3,572,809 A | 3/1971 | Buland |
| 3,588,167 A | 6/1971 | Ratcliff et al. |
| 3,596,416 A | 8/1971 | Hojka |
| 3,612,589 A | 10/1971 | Locher, Jr. |
| 3,719,386 A | 3/1973 | Puckett et al. |
| 3,722,964 A | 3/1973 | Chitester et al. |
| 3,734,559 A | 5/1973 | Touchette |
| 3,738,502 A | 6/1973 | Noller |

(List continued on next page.)

FOREIGN PATENT DOCUMENTS

| | | |
|---|---|---|
| AU | 439-82 | 5/1982 |
| AU | 691-82 | 7/1982 |
| AU | 571620 | 12/1983 |
| CH | 663 586 | 12/1987 |
| DE | 1 203 140 | 10/1965 |
| DE | 28 40 487 | 3/1980 |
| EP | 0 083 317 | 7/1983 |
| FR | 1.107.260 | 8/1955 |
| FR | 1.470.553 | 3/1966 |
| FR | 1.570.553 | 3/1968 |
| FR | 2 360 444 | 2/1976 |
| GB | 1 403 328 | 8/1975 |
| GB | 2 001 589 | 2/1979 |
| GB | 2 044 343 | 10/1980 |

*Primary Examiner*—Thomas E Denion

(57) ABSTRACT

An equalizer for passively controlling the movements of two or more sliding tubes. The equalizer includes a plurality of pulleys interconnected by cables. The cables are movably connected between the pulleys and the movable tubes to ensure the equalization of movement of one tube relative to the other.

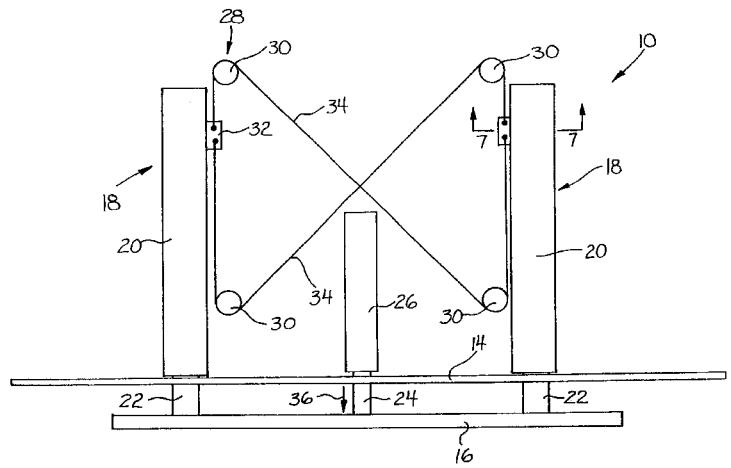

U.S. PATENT DOCUMENTS

| | | |
|---|---|---|
| 3,774,955 A | 11/1973 | Byer |
| 3,841,691 A | 10/1974 | Byer |
| 3,882,558 A | 5/1975 | Christensen |
| 3,915,492 A | 10/1975 | Agnese |
| 3,966,250 A | 6/1976 | Winskas |
| 4,049,310 A | 9/1977 | Yoder |
| 4,061,309 A | 12/1977 | Hanser |
| 4,071,116 A | 1/1978 | Halperin et al. |
| 4,087,069 A | 5/1978 | Hall et al. |
| 4,103,462 A | 8/1978 | Freller |
| 4,128,269 A | 12/1978 | Stewart |
| 4,130,069 A | 12/1978 | Evans et al. |
| 4,148,125 A | 4/1979 | Hanser |
| 4,165,861 A | 8/1979 | Hanser |
| 4,222,543 A | 9/1980 | Gedig et al. |
| 4,277,919 A | 7/1981 | Artweger et al. |
| 4,312,159 A | 1/1982 | Paul |
| 4,489,449 A | 12/1984 | Failor et al. |
| 4,500,132 A | 2/1985 | Yoder |
| 4,515,087 A | 5/1985 | Kurrasch |
| 4,570,547 A | 2/1986 | Colby |
| 4,577,821 A | 3/1986 | Edmo et al. |
| 4,597,584 A | 7/1986 | Hanser |
| RE32,262 E | 10/1986 | Stewart |
| 4,651,652 A | 3/1987 | Wyckoff |
| 4,667,605 A | 5/1987 | Bastian |
| 4,669,773 A | 6/1987 | LeVee |
| 4,743,037 A | 5/1988 | Hanser |
| 4,746,133 A | 5/1988 | Hanser et al. |
| 4,797,831 A | 1/1989 | Dressing et al. |
| 4,880,285 A | 11/1989 | Brinkers |
| 4,900,217 A | 2/1990 | Nelson |
| 4,913,458 A | 4/1990 | Hamilton |
| 4,930,837 A | 6/1990 | Marsh et al. |
| 4,955,661 A | 9/1990 | Mattice |
| 4,969,403 A | 11/1990 | Schwartz et al. |
| 4,981,085 A | 1/1991 | Watt |
| 4,981,319 A | 1/1991 | Gerzeny et al. |
| 5,050,927 A | 9/1991 | Montanari |
| 5,061,006 A | 10/1991 | Baughman |
| 5,078,441 A | 1/1992 | Borskey |
| 5,088,421 A | 2/1992 | Beckstead |
| 5,090,749 A | 2/1992 | Lee |
| 5,154,469 A | 10/1992 | Morrow |
| 5,176,391 A | 1/1993 | Schneider et al. |
| 5,237,782 A | 8/1993 | Cooper |
| 5,238,290 A | 8/1993 | Farmont |
| 5,265,668 A | 11/1993 | Fisher |
| 5,282,593 A | 2/1994 | Fast |
| 5,320,047 A | 6/1994 | Deurloo et al. |
| 5,332,276 A | 7/1994 | Blodgett, Jr. |
| 5,333,420 A | 8/1994 | Eden |

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

\* \* \* \* \*